E. MESSMER.
DENTAL AIR PUMP.
APPLICATION FILED MAY 27, 1909.

971,913.

Patented Oct. 4, 1910.

UNITED STATES PATENT OFFICE.

EDUARD MESSMER, OF GRATZ, AUSTRIA-HUNGARY.

DENTAL AIR-PUMP.

971,913.     Specification of Letters Patent.     Patented Oct. 4, 1910.

Application filed May 27, 1909. Serial No. 498,715.

*To all whom it may concern:*

Be it known that I, EDUARD MESSMER, dentist, a subject of the Emperor of Austria-Hungary, and resident of Gratz, in the Dukedom of Steiermark, Austria-Hungary, have invented certain new and useful Improvements in Dental Air-Pumps, of which the following is a specification.

My invention relates to improvements in dental air pumps, consisting of a metal casing and plunger, and being constructed in such a manner that it combines all the advantages of the soft rubber pumps, and of the usual cylinder pumps, without any of their attendant drawbacks.

Among others, this device possesses the novel features that it is entirely constructed of metal, so that it can be baked or immersed in boiling water and thoroughly sterilized, while it is as simple and handy as those pumps having soft rubber press balls or bellows.

Figure 1:
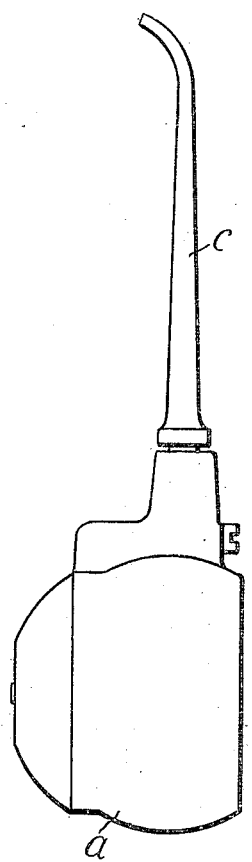
Figure 2:
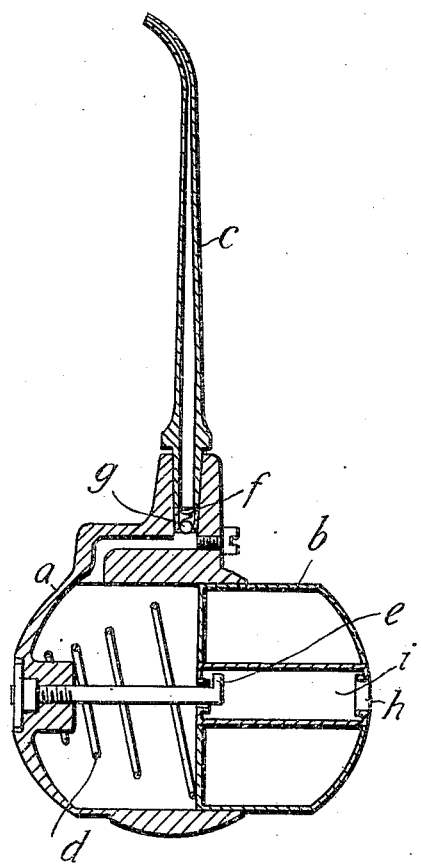
Figure 3:
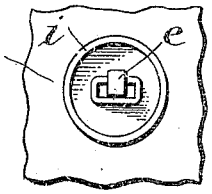

Referring to the drawing, which forms part of this specification, Figure 1 represents a side elevation with the plunger depressed ready for drawing in air or the like. Fig. 2 is a side elevation in section showing the plunger extended. Fig. 3 is a detail of construction.

The pump casing $a$ is spherically shaped and so is the extreme outer surface of the plunger $b$ which is inserted therein and which is perpendicular to the stem $c$, so that the instrument can be held and operated by the same hand, without imparting any undesirable motion to the stem $c$. A spring $d$ is conveniently arranged on the interior of the casing $a$, said spring serving to force the plunger out again after it has been pressed into the casing and released. Secured to the casing and running through the center of the spring is a pin $e$, the edge of which projects up behind the opening in the plunger (as shown in Fig. 2). One of the sides of the opening is longer than the other so that when it is desired to take the plunger out for cleaning purposes, the latter is turned until the opening is no longer covered by the projecting end of the pin $e$, whereupon the plunger can be pulled right out. The insertion of the plunger is equally simple. The plunger is inserted and turned until the pin projects through the opening. After this, the plunger is turned a little more until the projecting edge of said pin engages behind the edge of the opening. The check valve $g$ which is kept on its seat by means of its spring $f$ prevents the drawing in of the saliva, drill dust or other matters which else might be drawn out of the mouth into the casing.

The pipe $i$ passing down the center of the plunger is provided with an orifice $h$, so that, instead of being filled with air from the patient's mouth, the pump can be filled with fresh atmospheric air which enters by the orifice $h$, passes down the pipe $i$ through the opening into the center of the pump.

As all the parts are made of metal, the instrument can be baked or boiled for purposes of sterilization or can be heated for injecting dry warm air.

Having now particularly described and ascertained the nature of my said invention, and in what manner the same is to be performed, I declare that what I claim is:

In a metallic dental air pump, the combination with a casing, of a plunger provided with a cover operating therein and being provided with centrally arranged holes in its cover and bottom portion, a hollow member inserted into said holes having a hole at the front portion thereof and an elongated opening in the bottom portion of the same, opening thus a communication between the atmosphere and the interior of said casing, a pin attached to said casing having a projection adapted to protrude through said elongated opening, whereby said plunger is held in engagement with said casing when the former is shifted so that the longitudinal axes of said elongated opening and said projection are out of alinement and capable of being disengaged from said casing when said axes coincide, a spring arranged in said casing bearing against the same and the bottom portion of said plunger whereby the latter is caused to project out of the casing, a hollow stem detachably mounted upon said casing, and communicating with the interior of said casing, and a check valve in said stem, for the purpose specified.

Signed at Gratz in the Dukedom of Steiermark, Austria-Hungary, this third day of May A. D. 1909.

EDUARD MESSMER.

Witnesses:
  SIGMUND KUNTNER,
  JOSEF BENES.